United States Patent [19]

Komatsu et al.

[11] Patent Number: 4,983,899
[45] Date of Patent: Jan. 8, 1991

[54] NUMERICAL CONTROL APPARATUS FOR CONTROLLING A FEED SHAFT AND MAIN SHAFT OF A MACHINE TOOL

[75] Inventors: Toshiteru Komatsu; Kunio Miura, both of Aichi, Japan

[73] Assignee: Kabushiki Kaisha Okuma Tekkosho, Aichi, Japan

[21] Appl. No.: 385,415

[22] Filed: Jul. 26, 1989

[30] Foreign Application Priority Data

Jul. 29, 1988 [JP] Japan ................................ 62-190173

[51] Int. Cl.$^5$ ............................................ G05B 19/25
[52] U.S. Cl. ..................................... 318/571; 318/573; 318/39; 364/474.15; 364/474.11
[58] Field of Search ......................... 318/571, 573, 39; 364/474.15, 474.11

[56] References Cited

U.S. PATENT DOCUMENTS 4,079,235 3/1978 Froyd et al. .................... 318/571 X
4,353,018 10/1982 Kohzai et al. ...................... 318/571
4,879,660 11/1989 Asokura et al. ................. 318/39 X Primary Examiner—William M. Shoop, Jr.
Assistant Examiner—Saul M. Bergmann
Attorney, Agent, or Firm—Wenderoth, Lind & Ponack

[57] ABSTRACT

A numerical control apparatus is provided for controlling a position of a feed shaft in relation to a rotational angle of a main shaft of a machine tool. A value denoting the actual position of the feed shaft is subtracted from a positional command value to obtain a positional deviation value. The positional command value is one of a plurality of prestored values corresponding to a given rotational position of the main shaft. The positional deviation values for a single rotation of the main shaft are stored in a data table and displayed on a display device. Another data table having a plurality of correction values stored therein is provided. Each of the plurality of correction values stored in the correction value data table corresponds to a given rotational position of the main shaft. For each rotational position of the main shaft, the positional deviation value and a corresponding correction value are added together to obtain a corrected deviation value. The corrected deviation value is used to control the position of the feed shaft. If the displayed positional deviation values are seen as being excessive, the user is able to change the correction values, and by trial and error, obtain a more favorable position of the feed shaft.

20 Claims, 3 Drawing Sheets 4,983,899

NUMERICAL CONTROL APPARATUS FOR CONTROLLING A FEED SHAFT AND MAIN SHAFT OF A MACHINE TOOL

BACKGROUND OF THE INVENTION

The present invention relates to a numerical control apparatus which operates to detect follow-up error, and which operates to precisely and synchronously a rotation control angle of a main shaft (spindle), of an NC (numerical control) lathe for example, and a moving position of a feed shaft.

FIG. 1 is a block diagram showing an example of the conventional NC apparatus for synchronously controlling a rotational angle of a main shaft, of a conventional NC lathe and the like and a position of a feed shaft. As shown, the conventional NC apparatus has a main shaft pulse generator 8 for detecting a rotational angle of a main shaft 7, a pulse counter 9 for counting A and B phase pulses, and a marker pulse start signal, generated by the main shaft pulse generator 8, a latch circuit 12 for reading, through a positional detector 10 and a counter 11, the present position of a feed shaft driven by a servo motor 6 in response to a present position reading signal sent from the pulse counter 9, and a positional data table for command 1 positional command values storing and for generating integrally off-line a positional command value of the feed shaft corresponding to the pulses denoting a single rotation of the main shaft which are generated by the main shaft pulse generator 8. Furthermore, the conventional NC apparatus comprises a substracter 2 for determining a positional deviation value, in which a table address signal received from the pulse counter 9 is utilized as a control timing, by subtracting the present position of the latch circuit 12 from the positional command value read from the positional command data table 1. Also provided are a D/A converter for controlling the servomotor 6 according to the positional deviation value outputted by the subtracter 2 and synchronizing the position of the feed shaft with the rotational angle of the main shaft 7, an analog-gain amplifier 4 and a servo-amplifier 5.

In the operation of such a conventional NC apparatus, synchronous control is effected every time the main shaft pulse generator 8 outputs the A and B phase pulses. When the next marker pulse is outputted, the control returns to the first positional command value and the same control operation is repeated.

Since the above conventional NC apparatus outputs a positional command value which has been previously stored in response to and corresponding to the pulse signals generated by the main shaft pulse generator 8, it is not necessary to have a time in which a function generation and process is carried out. As a result, response is possible even when the rotational speed of the main shaft is high, thereby enabling a high speed cutting operation. However, since the function generation is not carried out on a real time basis, the follow-up error of the feed shaft disadvantageously becomes accordingly large. Consequently, in order to achieve precision machining it is necessary, to change the operating conditions (for example, by changing the command values) until the accuracy of the workpiece becomes a predetermined value and to then repeat the cutting or machining operation and measurement (for example, the workpiece is removed from the NC lathe after it is cut and then an exclusive-use measurement device is used in a temperature-controlled room to measure the workpiece), thereby requiring the expenditure of much time.

SUMMARY OF THE INVENTION

It is an object of the present invention to provide an NC apparatus capable of detecting and correcting the follow-up error of the feed shaft during a high speed cutting operation, whereby precise cutting and machining of a workpiece may be carried out.

According to the NC apparatus of the present invention, the positional command value of the feed shaft of an NC machine tool, which corresponds to the detected present rotational angle of the main shaft, is read out of a positional command values table. The positional command values table has stored therein positional values of the feed shaft corresponding to each rotational angle of a single rotation of the main shaft. Synchronous control is effected according to the positional deviation value of the feed shaft which is determined by subtracting the detected present positional value of the feed shaft from the read positional command value of the feed shaft. The above object of the present invention is accomplished by the provision of a means for reading out a positional correction value of the feed shaft, corresponding to the detected present rotational angle value of the main shaft, from a positional correction values of table having previously stored value according to each rotational angle of a single rotation of the main shaft. Synchronous control is carried out according to a value determined by adding a positional correction value to the positional deviation value of the feed shaft. In addition, the numerical control apparatus of the present invention functions to displaying the positional deviation value of the feed shaft on a graphic display unit.

PREFERRED EMBODIMENT OF THE INVENTION

According to the present invention, an NC (numerical control) apparatus having a detection function for follow-up error comprises a means for storing positional correction values, respectively corresponding to positional command values of a feed shaft, the positional command values corresponding to the number of pulses generated by a main shaft pulse generator in a single rotation of the main shaft, which are used to correct positional deviation values of the feed shaft. As a result, it is possible to precisely carry out a synchronous control operation of a rotational angle of the main shaft and a position of the feed shaft during a high speed cutting operation. In addition, the positional deviation value of the feed shaft during the synchronous control is displayed on a graphic screen or display, so that an operator can immediately determine the suitability of the positional correction values and reset the positional correction values to more suitable values if necessary.

Figure 1:
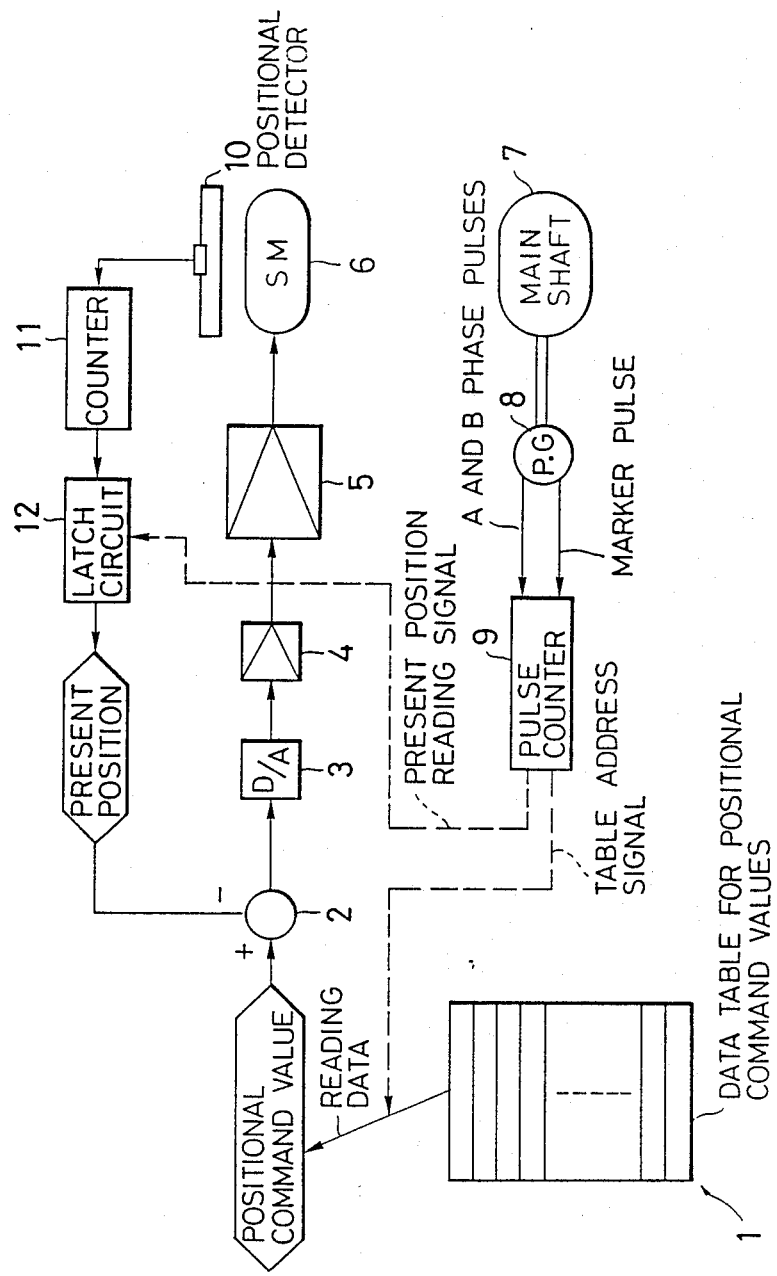
FIG. 1 is a block diagram showing an example of the conventional NC apparatus.
Figure 2:
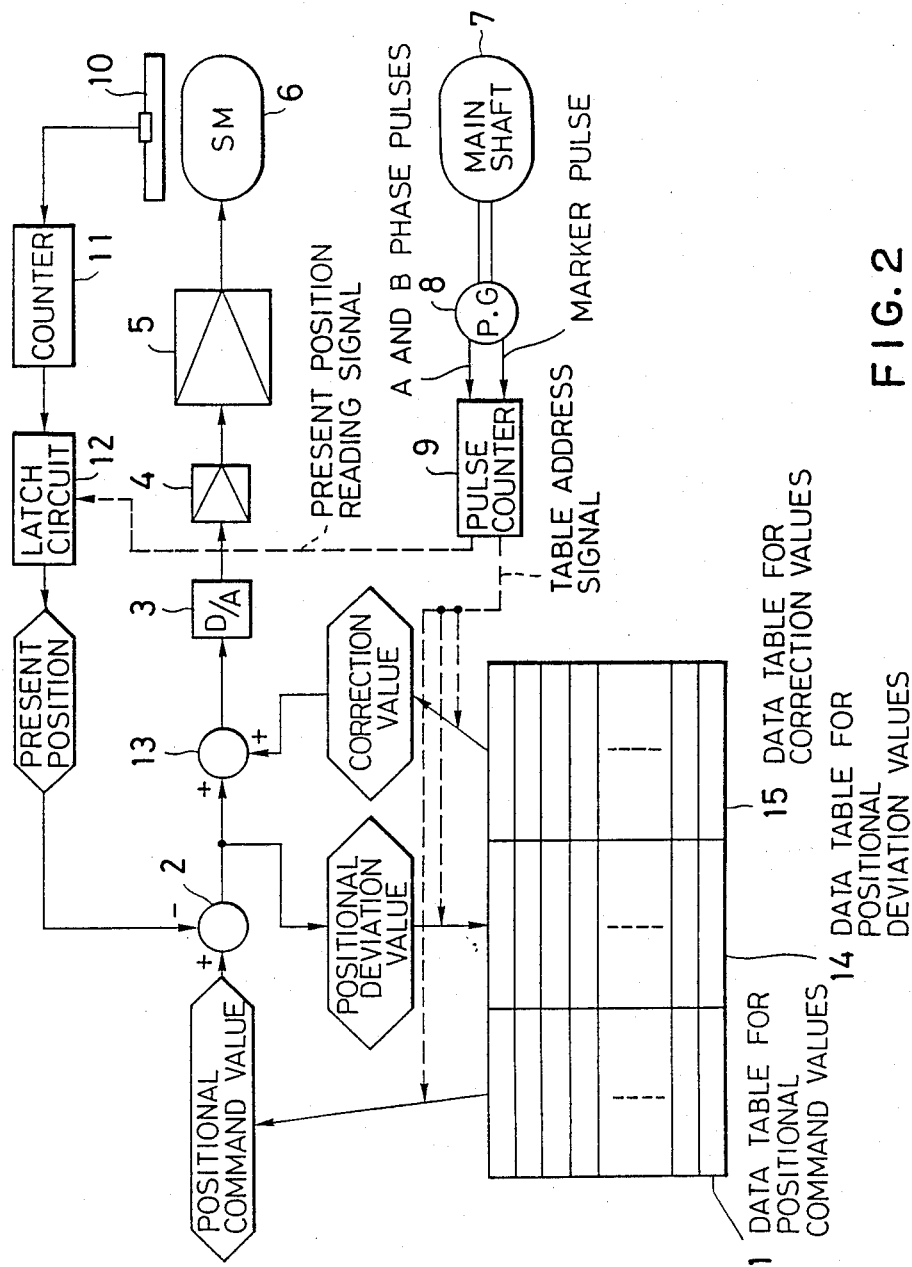
FIG. 2 is a block diagram showing an embodiment of the NC apparatus of the present invention for detecting and correcting follow-up errors.

FIG. 2 is a block diagram of an embodiment of the NC apparatus according to the present invention, in which like parts as shown in FIG. 1 are denoted by like reference numerals and explanations the like parts are omitted.

The NC apparatus of the present invention includes a correction values data table 15 for previously storing the correction values corresponding to the positional command values, a positional deviation values data table 14 for storing the positional deviation values outputted by the subtracter 2 in accordance with the table address signal received sent from the pulse counter 9, and an adder 13 for adding a correction value read from the correction values data table 15 and the positional deviation value outputted by the subtracter 2, according to the control timing of the table address signal of the pulse counter 9, and for outputting added the result to the D/A converter 3.

Figure 3:
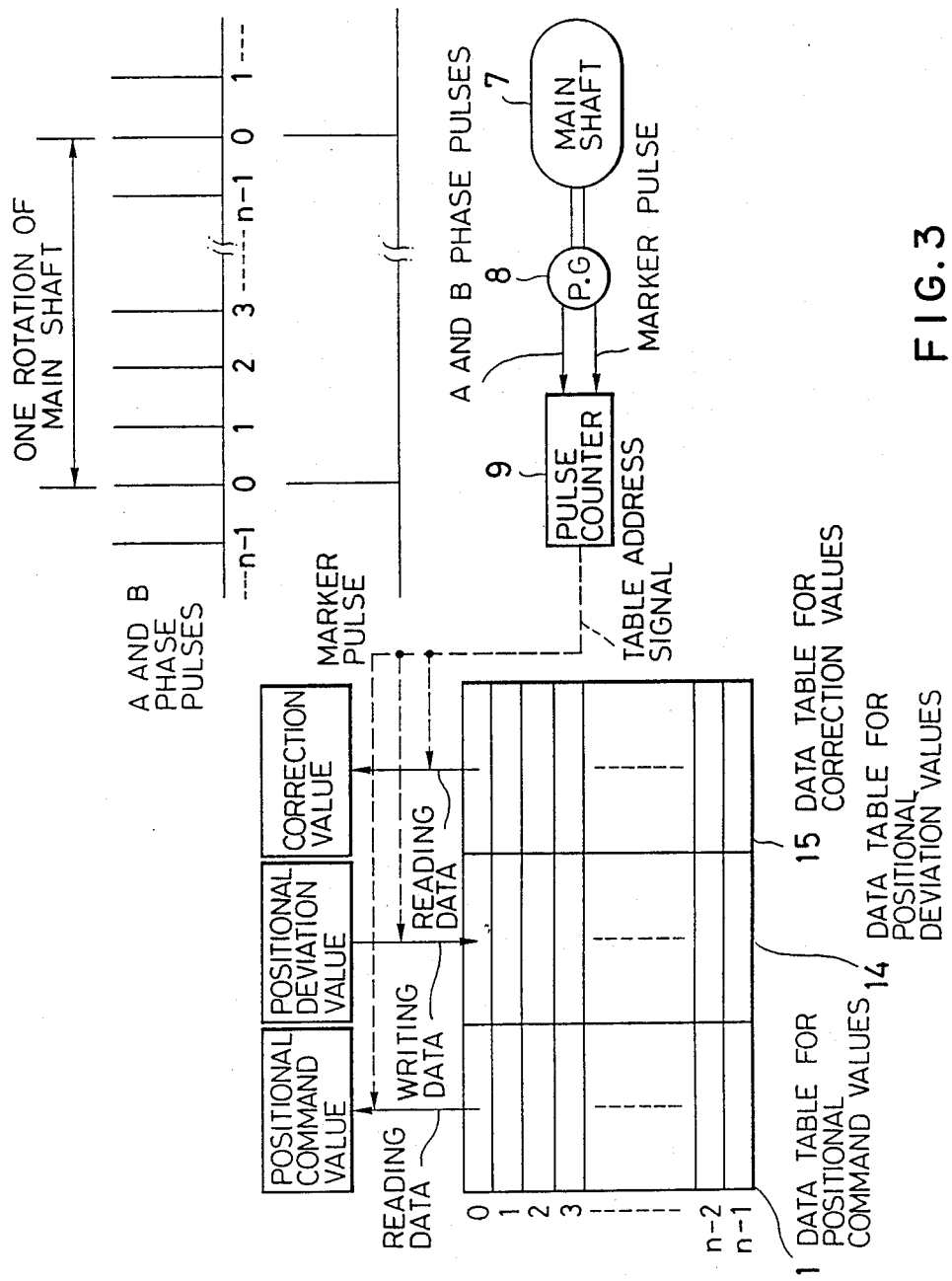
FIG. 3 is a diagram explaining an exemplified operation of the primary portion of the present invention.

The examplified operation of the NC apparatus is described with reference to FIG. 3. Supposing that the main shaft 7 rotates a single turn to generate the A and B phase pulses and that the number of the pulses thus generated is n, the table address signal outputted by the pulse counter 9 when the main shaft 7 rotates along the positive direction are counted up in pulse number, such as 0, 1, 2, (n−2), (n−1). The table address signal of such counting is the control timing, and the positional command value and the correction value are respectively read from the positional command values data table 1 and the correction values data tables 15. Then, the positional deviation value is written in to the positional deviation values data table 14 according to the above table address signal. This operation is repeated each time the A and B phase pulses are outputted from the main shaft pulse generator 8. When the next marker pulse is outputted, the first positional command value is returned to and the operation described above is repeated.

The table address signal sent from the pulse counter 9 when the main shaft 7 rotates in the reverse or negative direction counts down in pulse number, such as (n−1), (n−2), 2, 1, 0. Since the counting down signal is used as the control timing, the same operation as that of the positive rotation of the main shaft 7 is carried out.

The positional deviation values stored in the positional deviation values data table 14 are graphically displayed on a graphic display unit of the NC apparatus as a follow-up error of the tool during a single rotation of the main shaft 7. Consequently, it is possible to determine whether or not the correction values stored in the correction values data tables 15 is suitable for the position control system. That is, if the graphically depicted positional deviation values are seen as being too excessive, then the correction values are deemed not suitable. If the correction value is not suitable for the position control system, the correction value is finely adjusted, by trial and error, until the positional deviation values are at an acceptable level. The described above operation is then carried out using new correction values.

According to the NC apparatus for detecting and correcting follow-up error of the present invention, it is possible to correct or supplement the follow-up error of the feed shaft during the cutting operation, thereby obtaining precise and high speed cutting of a workpiece and reducing the manufacturing and machining cost of the workpiece. In addition, since the operator can visually recognize the follow-up error graphically displayed, it is not necessary to repeat, as in the conventional machining procedures, the steps of machining and measuring of the product trial and error, thus realizing a reduction the number of manufacturing steps.

While the preferred embodiment of the present invention has been herein disclosed, it is to be understood that other forms of the present invention might be adapted.

What is claimed is:

1. A numerical control apparatus for controlling a position of a feed shaft in relation to a rotational angle of a main shaft of a machine tool, said numerical control apparatus comprising:

first means for detecting an actual position of the feed shaft and for outputting a first feed shaft position value according to the thus detecting actual position of the feed shaft;

second means for detecting a rotational position of the main shaft and for outputting a main shaft rotational position signal according to the thus detected rotational position of the main shaft;

third means, responsive to said main shaft rotational position signal output by said second means, for outputting a predetermined second feed shaft position value which correspond to a predetermined rotational position of the main shaft;

fourth means for subtracting one of said first and second feed shaft position values from the other of said first and second feed shaft position values, and for outputting a corresponding positional deviation value;

fifth means for adjusting said positional deviation value according to a correction value, and for outputting a corresponding corrected positional deviation value; and sixth means for controlling a position of the feed shaft according to said corrected positional deviation value.

2. A numerical control apparatus as recited in claim 1, further comprising means for displaying said positional deviation value outputted by said fourth means.

3. A numerical control apparatus as recited in claim 1, said fifth means comprising:

a first data table having stored therein a plurality of predetermined correction values, each of said plurality of predetermined correction values corresponding to a predetermined rotational position of the main shaft;

seventh means, responsive to said main shaft rotational positional signal outputted by said second means, for outputting as said correction value one of said plurality of predetermined correction values stored in said first data table; and, an adder for adding said correction value and said positional deviation value, and for outputting said corrected positional deviation value.

4. A numerical control apparatus as recited in claim 3, said fifth means comprising:

a first data table having stored therein a plurality of predetermined correction values, each of said plurality of predetermined correction values corresponding to a predetermined rotational position of the main shaft;

seventh means, responsive to said main shaft rotational positional signal outputted by said second means, for outputting as said correction value one of said plurality of predetermined correction values stored in said first data table; and, an adder for adding said correction value and said positional deviation value, and for outputting said corrected positional deviation value.

5. A numerical control apparatus as recited in claim 1, further comprising a second data table for storing a plurality of said positional deviation values outputted said fourth means according to one rotation of the main shaft.

6. A numerical control apparatus as recited in claim 3, further comprising a second data table for storing a plurality of said positional deviation values outputted by said fourth means according to one rotation of the main shaft.

7. A numerical control apparatus as recited in claim 3, further comprising a second data table for storing a plurality of said positional deviation values outputted by said fourth means according to one rotation of the main shaft.

8. A numerical control apparatus as recited in claim 4, further comprising a second data table for storing a plurality of said positional deviation values outputted by said fourth means according to one rotation of the main shaft.

9. A numerical control apparatus as recited in claim 5, further comprising means for displaying said plurality of positional deviation values stored in said second data table.

10. A numerical control apparatus as recited in claim 6, further comprising means for displaying said plurality of positional deviation values stored in said second data table.

11. A numerical control apparatus as recited in claim 7, further comprising means for displaying said plurality of positional deviation values stored in said second data table.

12. A numerical control apparatus as recited in claim 8, further comprising means for displaying said plurality of positional deviation values stored in said second data table.

13. A numerical control apparatus as recited in claim 3, further comprising means for changing said plurality of predetermined corrected values stored in said first data table when said positional deviation value is determined to be of an excessive value.

14. A numerical control apparatus as recited in claim 4, further comprising means for changing said plurality of predetermined corrected values stored in said first data table when said positional deviation value is determined to be of an excessive value.

15. A numerical control apparatus as recited in claim 7, further comprising means for changing said plurality of predetermined corrected values stored in said first data table when said positional deviation value is determined to be of an excessive value.

16. A numerical control apparatus as recited in claim 8, further comprising means for changing said plurality of predetermined corrected values stored in said first data table when said positional deviation value is determined to be of an excessive value.

17. A numerical control apparatus as recited in claim 9, further comprising means for changing said plurality of predetermined corrected values stored in said first data table when said positional deviation value is determined to be of an excessive value.

18. A numerical control apparatus as recited in claim 10, further comprising means for changing said plurality of predetermined corrected values stored in said first data table when said positional deviation value is determined to be of an excessive value.

19. A numerical control apparatus as recited in claim 11, further comprising means for changing said plurality of predetermined corrected values stored in said first data table when said positional deviation value is determined to be of an excessive value.

20. A numerical control apparatus as recited in claim 12, further comprising means for changing said plurality of predetermined corrected values stored in said first data table when said positional deviation value is determined to be of an excessive value.

* * * * *